United States Patent
Jiang

(10) Patent No.: US 11,665,733 B2
(45) Date of Patent: May 30, 2023

(54) PREAMBLE AND SCHEDULING REQUEST TRANSMITTING METHOD AND DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 144 days.

(21) Appl. No.: 17/052,504

(22) PCT Filed: May 18, 2018

(86) PCT No.: PCT/CN2018/087562
§ 371 (c)(1),
(2) Date: Nov. 2, 2020

(87) PCT Pub. No.: WO2019/218366
PCT Pub. Date: Nov. 21, 2019

(65) Prior Publication Data
US 2021/0176773 A1     Jun. 10, 2021

(51) Int. Cl.
*H04W 72/12*   (2023.01)
*H04W 72/566*  (2023.01)
(Continued)

(52) U.S. Cl.
CPC ....... *H04W 72/566* (2023.01); *H04L 41/0654* (2013.01); *H04W 74/0833* (2013.01)

(58) Field of Classification Search
CPC .......... H04W 72/0446; H04W 72/0453; H04L 5/001; H04L 5/0078; H04L 1/1835; H04L 5/0098
See application file for complete search history.

(56) References Cited

U.S. PATENT DOCUMENTS 8,964,679 B2  2/2015  Anderson et al.
9,603,048 B2  3/2017  Pelletier et al.
(Continued)

FOREIGN PATENT DOCUMENTS

CN   101489254 A   7/2009
CN   102271415 A   12/2011
(Continued)

OTHER PUBLICATIONS

Mediatek Inc: "On parallel SR and RACH procedure in NR", 3GPP Draft;R2-1806164 on Parallel SR and RACH Procedure in NR. (3GPP), Mobile Competence Centre : 650. Route Deslucioles: F-06921 Sophia-Antipolis Cedex ; FRANCElvol. RAN WG2, no. Sanya, China; 20180416201804206. (Year: 2018).*
(Continued)

*Primary Examiner* — Romani Ohri
(74) *Attorney, Agent, or Firm* — Syncoda LLC; Feng Ma

(57) ABSTRACT

It is determined whether a first first resource among at least one first resource used for sending a random access preamble overlaps a first second resource among at least one second resource used for sending a first scheduling request on a predetermined time unit; if the resources overlap, the preamble is sent by means of a first resource that does not overlap with a second resource, and the first scheduling request is sent by means of a second resource that does not overlap with a first resource.

18 Claims, 17 Drawing Sheets

---

S1, it is determined whether a primary first resource of at least one first resource configured for sending a preamble for random access and a primary second resource of at least one second resource configured for sending a first SR overlap in a preset time unit S2, when the primary first resource and the primary second resource overlap, the preamble is sent through the at least one first resource not overlapping the at least one second resource, and the first SR is sent through the at least one second resource not overlapping the at least one first resource

(51) Int. Cl.
*H04L 41/0654* (2022.01)
*H04W 74/08* (2009.01)

(56) References Cited

U.S. PATENT DOCUMENTS

| 9,980,295 | B2 | 5/2018 | Pelletier et al. |
|---|---|---|---|
| 2013/0163533 | A1 | 6/2013 | Anderson et al. |
| 2013/0242730 | A1 | 9/2013 | Pelletier et al. |
| 2015/0257144 | A1* | 9/2015 | Hooli .................... H04W 72/21 370/329 |
| 2017/0135135 | A1 | 5/2017 | Pelletier et al. |

FOREIGN PATENT DOCUMENTS

| CN | 104186010 | A | 12/2014 |
|---|---|---|---|
| CN | 107645785 | A | 1/2018 |
| WO | 2014205681 | A1 | 12/2014 |
| WO | 2016175398 | A1 | 11/2016 |

OTHER PUBLICATIONS

3GPP TSG-RAN WG1 Meeting #92bis R1-1804032; Agenda Item: 7.1.1.4.2; Source: ASUSTeK; Title: Collision between PRACH transmission and SR transmission (Year: 2018).*
3GPP TSG-RAN WG1 Meeting #92bis R1-1804032; Agenda Item: 7.1.1.4.2; Source: ASUSTeK; Title: Collision between PRACH transmission and SR transmission.
First Office Action of the Chinese application No. 201880000687.5, dated Feb. 11, 2022.
International Search Report in the international application No. PCT/CN2018/087562, dated Jan. 23, 2019.
English translation of the Written Opinion of the International Search Authority in the international application No. PCT/CN2018/087562, dated Jan. 23, 2019.
Lenovo et al: "Parallel SR and RACH procedure",3GPP Draft; R2-1807121, 3rd Generation Partnership Project (3GPP), Mobile Competence Centre : 650, Route Des Lucioles: F-06921 Sophia-Antipolis Cedex ; FRANCE vol. RAN WG2, no. Busan, Korea; May 21, 2018-May 25, 2018 May 10, 2018 (May 10, 2018), XP051464033,Retrieved from the Internet:URL: http://www.3gpp.org/ftp/tsg%5Fran/WG2%5FRL2/TSGR2%5F102/Docs [retrieved on May 10, 2018] *1 Introduction * *2 Discussion * * Proposal 1 *.
Mediatek Inc: "On parallel SR and RACH procedure in NR", 3GPP DRAFT;R2-1806164 on Parallel SR and RACH Procedure in NR. 3rd Generation Partnership Project (3GPP), Mobile Competence Centre : 650. Route Deslucioles: F-06921 Sophia-Antipolis Cedex ; FRANCE ivol. RAN WG2, no. Sanya, China; Apr. 16, 2018Apr. 20, 2018Apr. 6, 2018 (Apr. 6, 2018), XP051416474,Retrieved from the Internet:URL: http://www.3gpp.org/ftp/tsg%5Fran/WG2%5FRL2/TSGR2%5F101bis/Docs/ [retrieved on 2018-04-061* Alternative 2.
Xiaomi: "Additional Issues of the SR Procedure "3GPP Draft: R2-1713938 Additional Issues of SR Procedure. 3rd Generation Partnership Project (3GPP). Mobile Competence Centre ; 650, Route Deslucioles: F-06921 Sophia-Antipolis Cedex France'vol. RAN WG2, no. Reno, Nevada; Nov. 27, 2017Dec. 1, 2017 Nov. 22, 2017 (Nov. 22, 2017),XP051372602Retrieved from the Internet: URL:http://www.3gpp.org/ftp/tsg%5Fran/WG2%5FRL2/TSGR2%5F100/Docs/[retrieved on Nov. 22, 2017] * 2 Discussion ** 3 Conclusion *.
Supplementary European Search Report in the European application No. 18918509.3, dated Nov. 12, 2021.
Office Action of the Indian application No. 202047053840, dated Dec. 28, 2021.

* cited by examiner

PREAMBLE AND SCHEDULING REQUEST TRANSMITTING METHOD AND DEVICE

CROSS-REFERENCE TO RELATED APPLICATIONS

The present application is a national stage of International Application No. PCT/CN2018/087562 filed on May 18, 2018, the disclosure of which is hereby incorporated by reference in its entirety.

TECHNICAL FIELD

The subject disclosure relates to the field of communication, and more particularly, to a method, electronic equipment, and a computer-readable storage medium for sending a preamble and a Scheduling Request (SR).

BACKGROUND

A Buffer Status Report (BSR) may be triggered when User Equipment (UE) has new data to be transmitted through uplink. A SR may be triggered when there is no uplink resource available for transmitting the BSR. The SR may be transmitted to a base station through a Physical Uplink Control Channel (PUCCH) resource to request an uplink resource. Random access may have to be initiated to the base station when there is no PUCCH for transmitting the SR, wherein a preamble is first sent to the base station.

In some cases, UE has to send, to a base station, not only a SR, but also a preamble. For example, SRs may be triggered based respectively on a first logic channel and a second logic channel. There may be a PUCCH resource for transmitting a SR on the first logic channel. There may be no PUCCH resource for transmitting a SR on the second logic channel. Then, a SR may be sent to the base station through the PUCCH resource on the first logic channel to request an uplink resource. As for the second logic channel, a preamble may have to be sent to the base station for random access.

When UE has to send, to a base station, not only a SR, but also a preamble, a PUCCH resource for sending the SR and a Physical Random Access Channel (PRACH) resource for sending the preamble may overlap in time domain. However, a physical layer does not support sending the SR and the preamble on overlapping resources in time domain. Therefore, in related art, the physical layer may support sending only one of the SR or the preamble. Consequently, data on a logic channel corresponding to the unsent one may not be sent in time, which may negatively affect the sending of the data.

SUMMARY

In view of this, embodiments herein provide a method, a device, electronic equipment, and a computer-readable storage medium for sending a preamble and a SR.

According to a first aspect herein, a method for sending a preamble and a Scheduling Request (SR) includes:

determining whether a primary first resource of at least one first resource configured for sending a preamble for random access and a primary second resource of at least one second resource configured for sending a first SR overlap in a preset time unit;

in response to determining that the primary first resource and the primary second resource overlap, sending the preamble through the at least one first resource not overlapping the at least one second resource, and sending the first SR through the at least one second resource not overlapping the at least one first resource.

Optionally, the preset time unit may be a slot, a mini-slot, or a sub-frame.

Optionally, sending the preamble through the at least one first resource not overlapping the at least one second resource, and sending the first SR through the at least one second resource not overlapping the at least one first resource may include:

determining whether the primary first resource and the primary second resource are on a same carrier; and in response to determining that the primary first resource and the primary second resource are on a same carrier, sending the preamble through the at least one first resource not overlapping the at least one second resource, and sending the first SR through the at least one second resource not overlapping the at least one first resource.

Optionally, sending the preamble through the at least one first resource not overlapping the at least one second resource, and sending the first SR through the at least one second resource not overlapping the at least one first resource may include:

determining whether the random access corresponding to the preamble is triggered by a state that a first logic channel triggers a second SR without a third resource configured for sending the second SR;

in response to determining that the random access is triggered by the state, determining whether a priority of a second logic channel triggering the first SR is higher than a priority of the first logic channel;

in response to determining that the priority of the second logic channel is higher than the priority of the first logic channel, sending the preamble through the at least one first resource not overlapping the at least one second resource, and sending the first SR through the at least one second resource not overlapping the at least one first resource.

Optionally, sending the preamble through the at least one first resource not overlapping the at least one second resource, and sending the first SR through the at least one second resource not overlapping the at least one first resource may include:

determining whether the random access corresponding to the preamble is triggered by a state that a first logic channel triggers a second SR without a third resource configured for sending the second SR;

in response to determining that the random access is triggered by the state, determining whether a priority of a second logic channel triggering the first SR is higher than a priority of the first logic channel;

in response to determining that the priority of the second logic channel is higher than the priority of the first logic channel, sending the first SR through the primary second resource, and sending the preamble through another resource of the at least one first resource that comes after the primary first resource, the another resource of the at least one first resource not overlapping the primary second resource in the preset time unit; and in response to determining that the priority of the first logic channel is higher than the priority of the second logic channel, sending the preamble through the primary first resource, and sending the first SR through another resource of the at least one second resource that comes after the primary second resource, the another resource of the at least one second resource not overlapping the primary first resource in the preset time unit.

Optionally, the priority of the first logic channel may be negatively correlated to a delay required by a service corresponding to the first logic channel. The priority of the second logic channel may be negatively correlated to a delay required by a service corresponding to the second logic channel.

Optionally, sending the preamble through the at least one first resource not overlapping the at least one second resource, and sending the first SR through the at least one second resource not overlapping the at least one first resource may include:

determining whether the random access corresponding to the preamble is triggered by a state that a first logic channel triggers a second SR without a third resource configured for sending the second SR;

in response to determining that the random access is triggered by the state, determining whether the first logic channel is a preset first logic channel and/or whether a second logic channel triggering the first SR is a preset second logic channel;

in response to determining that the first logic channel is a preset first logic channel and/or the second logic channel is a preset second logic channel, sending the preamble through the at least one first resource not overlapping the at least one second resource, and sending the first SR through the at least one second resource not overlapping the at least one first resource.

Optionally, the method may further include:

before sending the preamble through the at least one first resource not overlapping the at least one second resource, and sending the first SR through the at least one second resource not overlapping the at least one first resource, receiving indication of the preset first logic channel and/or the preset second logic channel.

Optionally, sending the preamble through the at least one first resource not overlapping the at least one second resource, and sending the first SR through the at least one second resource not overlapping the at least one first resource may include:

determining whether the random access corresponding to the preamble is configured for requesting a system message;

in response to determining that the random access is configured for requesting a system message, sending the preamble through the primary first resource, sending the preamble through the at least one first resource not overlapping the at least one second resource, and sending the first SR through the at least one second resource not overlapping the at least one first resource.

Optionally, sending the preamble through the at least one first resource not overlapping the at least one second resource, and sending the first SR through the at least one second resource not overlapping the at least one first resource may include:

determining whether the random access corresponding to the preamble is configured for Beam Failure Recovery (BFR);

in response to determining that the random access is configured for BFR, sending the preamble through the primary first resource, and sending the first SR through another resource of the at least one second resource that comes after the primary second resource, the another resource of the at least one second resource not overlapping the primary first resource in the preset time unit.

According to a second aspect herein, a device for sending a preamble and a SR includes a determining module and a sending module.

The determining module may be adapted to determining whether a primary first resource of at least one first resource configured for sending a preamble for random access and a primary second resource of at least one second resource configured for sending a first SR overlap in a preset time unit.

The sending module may be adapted to, in response to determining that the primary first resource and the primary second resource overlap, sending the preamble through the at least one first resource not overlapping the at least one second resource, and sending the first SR through the at least one second resource not overlapping the at least one first resource.

Optionally, the preset time unit may be a slot, a mini-slot, or a sub-frame.

Optionally, the sending module may include a carrier determining sub-module and a first sending sub-module.

The carrier determining sub-module may be adapted to determining whether the primary first resource and the primary second resource are on a same carrier.

The first sending sub-module may be adapted to, in response to determining that the primary first resource and the primary second resource are on a same carrier, sending the preamble through the at least one first resource not overlapping the at least one second resource, and sending the first SR through the at least one second resource not overlapping the at least one first resource.

Optionally, the sending module may include a trigger determining sub-module, a priority determining sub-module, and a second sending sub-module.

The trigger determining sub-module may be adapted to determining whether the random access corresponding to the preamble is triggered by a state that a first logic channel triggers a second SR without a third resource configured for sending the second SR.

The priority determining sub-module may be adapted to, in response to determining that the random access is triggered by the state, determining whether a priority of a second logic channel triggering the first SR is higher than a priority of the first logic channel.

The second sending sub-module may be adapted to, in response to determining that the priority of the second logic channel is higher than the priority of the first logic channel, sending the preamble through the at least one first resource not overlapping the at least one second resource, and sending the first SR through the at least one second resource not overlapping the at least one first resource.

Optionally, the sending module may include a trigger determining sub-module, a priority determining sub-module, and a third sending sub-module.

The trigger determining sub-module may be adapted to determining whether the random access corresponding to the preamble is triggered by a state that a first logic channel triggers a second SR without a third resource configured for sending the second SR.

The priority determining sub-module may be adapted to, in response to determining that the random access is triggered by the state, determining whether a priority of a second logic channel triggering the first SR is higher than a priority of the first logic channel.

The third sending sub-module may be adapted to, in response to determining that the priority of the second logic channel is higher than the priority of the first logic channel, sending the first SR through the primary second resource, and sending the preamble through another resource of the at least one first resource that comes after the primary first resource, the another resource of the at least one first resource not overlapping the primary second resource in the preset time unit; and in response to determining that the priority of the first logic channel is higher than the priority of the second logic channel, sending the preamble through the primary first resource, and sending the first SR through another resource of the at least one second resource that comes after the primary second resource, the another resource of the at least one second resource not overlapping the primary first resource in the preset time unit.

Optionally, the priority of the first logic channel may be negatively correlated to a delay required by a service corresponding to the first logic channel. The priority of the second logic channel may be negatively correlated to a delay required by a service corresponding to the second logic channel.

Optionally, the sending module may include a trigger determining sub-module, a channel determining sub-module, and a fourth sending sub-module.

The trigger determining sub-module may be adapted to determining whether the random access corresponding to the preamble is triggered by a state that a first logic channel triggers a second SR without a third resource configured for sending the second SR.

The channel determining sub-module may be adapted to, in response to determining that the random access is triggered by the state, determining whether the first logic channel is a preset first logic channel and/or whether a second logic channel triggering the first SR is a preset second logic channel.

The fourth sending sub-module may be adapted to, in response to determining that the first logic channel is a preset first logic channel and/or the second logic channel is a preset second logic channel, sending the preamble through the at least one first resource not overlapping the at least one second resource, and sending the first SR through the at least one second resource not overlapping the at least one first resource.

Optionally, the device may further include a receiving module.

The receiving module may be adapted to receiving indication of the preset first logic channel and/or the preset second logic channel.

Optionally, the sending module may include a request determining sub-module and a fifth sending sub-module.

The request determining sub-module may be adapted to determining whether the random access corresponding to the preamble is configured for requesting a system message.

The fifth sending sub-module may be adapted to, in response to determining that the random access is configured for requesting a system message, sending the preamble through the primary first resource, sending the preamble through the at least one first resource not overlapping the at least one second resource, and sending the first SR through the at least one second resource not overlapping the at least one first resource.

Optionally, the sending module may include a recovery determining sub-module and a sixth sending sub-module.

The recovery determining sub-module may be adapted to determining whether the random access corresponding to the preamble is configured for Beam Failure Recovery (BFR).

The sixth sending sub-module may be adapted to, in response to determining that the random access is configured for BFR, sending the preamble through the primary first resource, and sending the first SR through another resource of the at least one second resource that comes after the primary second resource, the another resource of the at least one second resource not overlapping the primary first resource in the preset time unit.

According to a third aspect herein, electronic equipment includes a processor and memory.

The memory is adapted to storing an instruction executable by the processor.

The processor is adapted to implementing the method for sending a preamble and a SR according to any embodiment herein.

According to a fourth aspect herein, a computer-readable storage medium has stored thereon a computer program which, when executed by a processor, implements the method for sending a preamble and a SR according to any embodiment herein.

With embodiments herein, the first SR may be sent through the at least one first resource not overlapping the at least one second resource, and the first SR may be sent through the at least one second resource not overlapping the at least one first resource. Accordingly, both the first SR and the preamble are sent to the base station respectively on a first resource and a second resource that do not overlap, thereby allowing both data corresponding to a logic channel corresponding to the first SR and data corresponding to a logic channel corresponding to the preamble to be sent to the base station in time.

BRIEF DESCRIPTION OF THE DRAWINGS

Drawings herein are introduced briefly for clearer illustration of a technical solution herein. Note that the drawings described below refer merely to some embodiments herein. For a person having ordinary skill in the art, other drawings may be acquired according to the drawings herein without creative effort.

DETAILED DESCRIPTION

Clear complete description to a technical solution herein is given below with reference to the drawings and embodiments herein. Clearly, embodiments illustrated herein are but some, instead of all, embodiments according to the subject disclosure. Based on the embodiments herein, a person having ordinary skill in the art may acquire another embodiment without creative effort. Any such embodiment falls within the scope of the subject disclosure.

Figure 1:
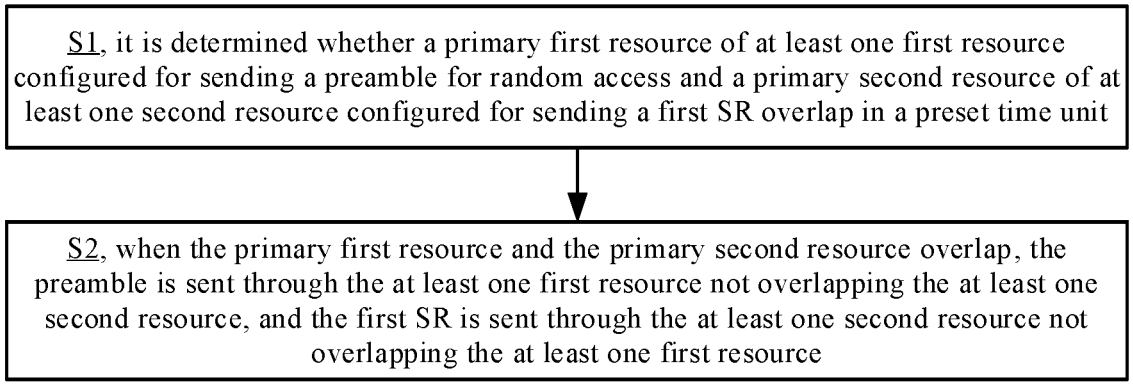
FIG. 1 is a flowchart of a method for sending a preamble and a SR according to an embodiment herein.

FIG. 1 is a flowchart of a method for sending a preamble and a SR according to an embodiment herein. The method herein may be applied to UE. The UE may be electronic equipment such as a mobile phone, a tablet computer, etc.

As shown in FIG. 1, the method for sending a preamble and a SR may include the following steps.

In S1, it is determined whether a primary first resource of at least one first resource configured for sending a preamble for random access and a primary second resource of at least one second resource configured for sending a first SR overlap in a preset time unit. If so, S2 may be implemented.

In an embodiment, after the UE triggers a BSR, if there is no uplink resource available for transmitting the BSR, a SR may be triggered. The UE may transmit the SR through a PUCCH resource. That is, a second resource may be a PUCCH resource. When there is no PUCCH resource available for transmitting the SR, the UE may have to initiate random access to a base station, by first sending a preamble for the random access to the base station.

Note that UE may send a preamble for initiating random access to a base station in a case other than when there is no PUCCH resource available for transmitting a SR, such as when the UE is to establish a communication connection with the base station, when the UE is to recover a communication connection with the base station, when the UE is to perform BFR, etc. A first resource may be a PRACH resource.

In an embodiment, there may be at least one first resource and at least one second resource. When there are multiple first resources and second resources, a primary second resource may refer to a second resource arriving first after trigger of the first SR. If random access is initiated because there is no PUCCH resource available for transmitting the first SR, the primary first resource may refer to a first resource arriving first after trigger of the first SR. If random access is initiated because of a need to establish the communication connection with the base station, or a need to recover the communication connection with the base station, or perform BFR, etc., the primary first resource may refer to a first resource arriving first after initiating the random access.

By saying that the primary first resource and the primary second resource overlap in the preset time unit, it may mean that the primary first resource and the primary second resource partially overlap or coincide in the preset time unit. A duration (such as a number of symbols therein) of the preset time unit may be set as needed.

In S2, the preamble is sent through the at least one first resource not overlapping the at least one second resource, and the first SR is sent through the at least one second resource not overlapping the at least one first resource.

It may not be possible to send both the first SR and the preamble on a first resource and a second resource that overlap. Therefore, in related art, when the primary first resource and the primary second resource overlap in the preset time unit, the preamble may be sent through the primary first resource, or the first SR may be sent through the primary second resource. Consequently, data corresponding to a logic channel corresponding to the unsent preamble or first SR may not be sent in time, impacting normal sending of the data.

Thus, with embodiments herein, the first SR may be sent through the at least one first resource not overlapping the at least one second resource, and the first SR may be sent through the at least one second resource not overlapping the at least one first resource. Accordingly, both the first SR and the preamble are sent to the base station respectively on a first resource and a second resource that do not overlap, thereby allowing both data corresponding to a logic channel corresponding to the first SR and data corresponding to a logic channel corresponding to the preamble to be sent to the base station in time.

Optionally, the preset time unit may be a slot, a mini-slot, or a sub-frame.

In an embodiment, it may be determined whether the primary first resource and the primary second resource overlap in the preset time unit by determining whether the primary first resource and the primary second resource overlap in a slot, a mini-slot, or a sub-frame, etc. Depending on a configuration, a mini-slot may include different numbers of time-domain symbols.

The slot, the mini-slot, and the sub-frame may be selected respectively as needed. For example, it may be determined whether the primary first resource and the primary second resource overlap in a selected slot. S2 may be implemented only when the primary first resource and the primary second resource overlap in the selected slot. S2 is not implemented when the primary first resource and the primary second resource overlap in a slot other than the selected slot.

Figure 2:
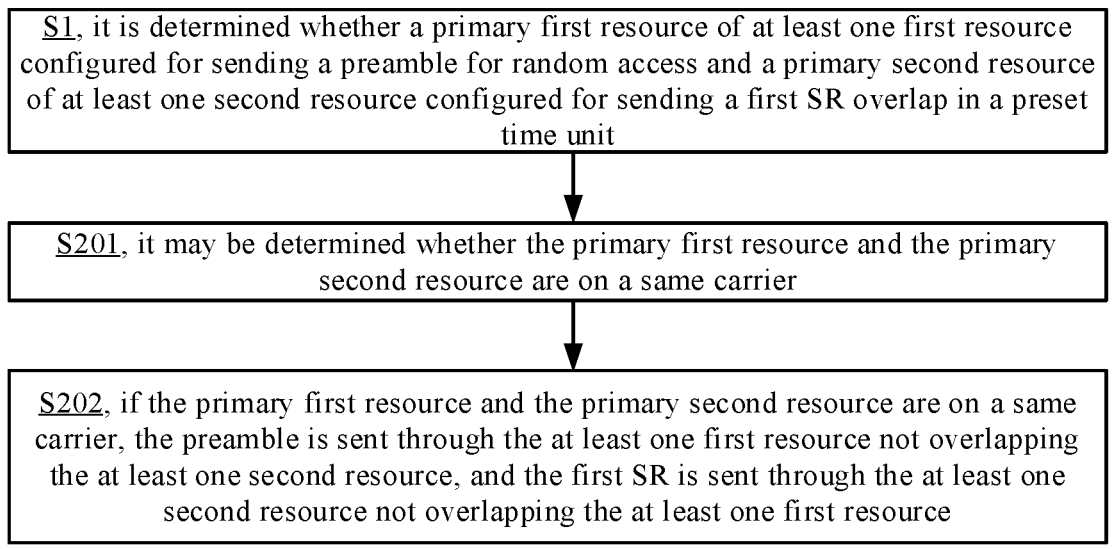
FIG. 2 is a flowchart of a method for sending a preamble and a SR according to an embodiment herein.

FIG. 2 is a flowchart of a method for sending a preamble and a SR according to an embodiment herein. As shown in FIG. 2, based on the embodiment shown in FIG. 1, the preamble may be sent through the at least one first resource not overlapping the at least one second resource, and the first SR may be sent through the at least one second resource not overlapping the at least one first resource, as follows.

In S201, it may be determined whether the primary first resource and the primary second resource are on a same carrier.

In S202, if the primary first resource and the primary second resource are on a same carrier, the preamble is sent through the at least one first resource not overlapping the at least one second resource, and the first SR is sent through the at least one second resource not overlapping the at least one first resource.

In an embodiment, when the primary first resource and primary second resource overlap in the preset time unit, it may be determined whether the primary first resource and the primary second resource are on a same carrier. If the primary first resource and the primary second resource are on a same carrier, the preamble is sent through the at least one first resource not overlapping the at least one second resource, and the first SR is sent through the at least one second resource not overlapping the at least one first resource. If the primary first resource and the primary second resource are on different carriers, it is unnecessary to send the preamble through the at least one first resource not overlapping the at least one second resource and send the first SR through the at least one second resource not overlapping the at least one first resource. This is because when the primary first resource and the primary second resource are on different carriers, there will be no significant impact on a peak-to-average ratio even if the first SR is transmitted through a second resource overlapping the at least one first resource and/or the preamble is transmitted through a first resource overlapping the at least one second resource. Accordingly, the first SR may be transmitted through a second resource overlapping the at least one first resource and/or the preamble may be transmitted through a first resource overlapping the at least one second resource, simplifying an operation.

Figure 3:
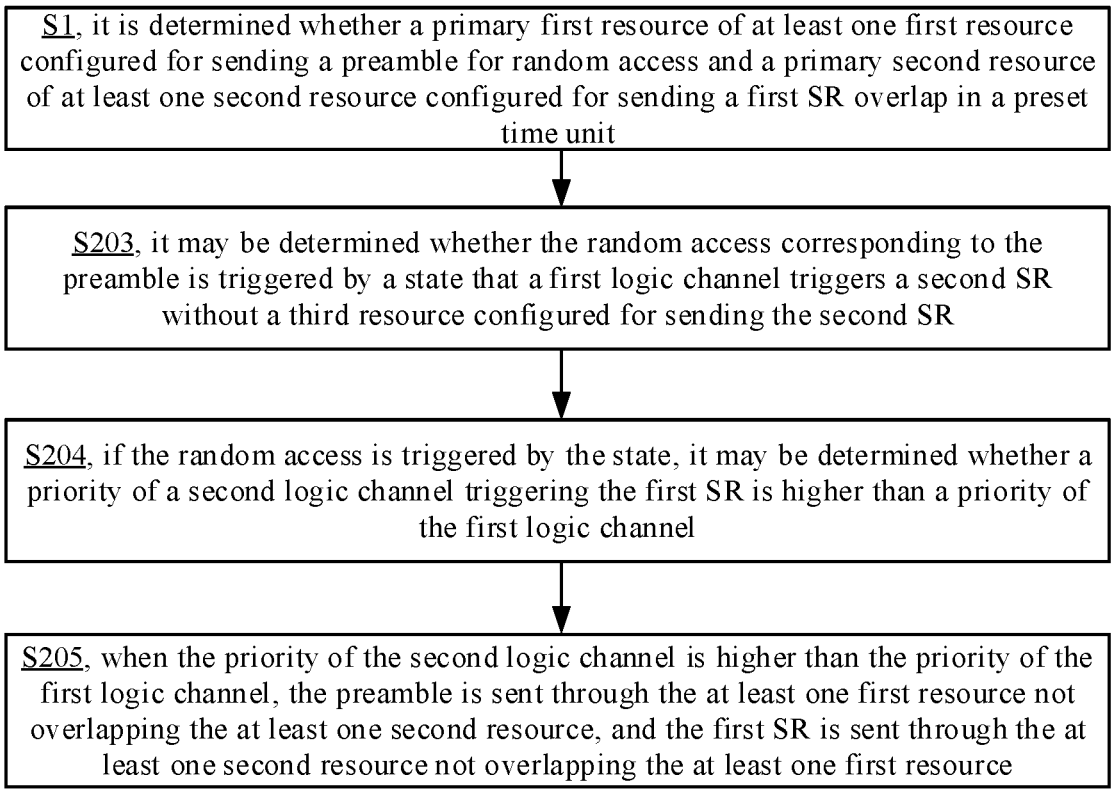
FIG. 3 is a flowchart of a method for sending a preamble and a SR according to an embodiment herein.

FIG. 3 is a flowchart of a method for sending a preamble and a SR according to an embodiment herein. As shown in FIG. 3, based on the embodiment shown in FIG. 1, the preamble may be sent through the at least one first resource not overlapping the at least one second resource, and the first SR may be sent through the at least one second resource not overlapping the at least one first resource, as follows.

In S203, it may be determined whether the random access corresponding to the preamble is triggered by a state that a first logic channel triggers a second SR without a third resource configured for sending the second SR.

In S204, if the random access is triggered by the state, it may be determined whether a priority of a second logic channel triggering the first SR is higher than a priority of the first logic channel.

In S205, in response to determining that the priority of the second logic channel is higher than the priority of the first logic channel, the preamble is sent through the at least one first resource not overlapping the at least one second resource, and the first SR is sent through the at least one second resource not overlapping the at least one first resource.

In related art, when the primary first resource and the primary second resource overlap in the preset time unit, the UE may select to send the preamble through the primary first resource, because by default the UE may prioritize preamble sending.

In an embodiment, when the primary first resource and the primary second resource overlap in the preset time unit, it may be determined whether the random access corresponding to the preamble is triggered by a state that a first logic channel triggers a second SR without a third resource configured for sending the second SR. If so, it may mean that services corresponding respectively to the first logic channel and the second logic channel trigger SRs respectively. Thus, the two logic channels may be compared. Accordingly, priorities of the first logic channel and the second logic channel may be compared.

When the priority of the second logic channel is higher than the priority of the first logic channel, it may mean that data of the service corresponding to the first logic channel is more important. Therefore, to avoid a failure to send the first SR triggered by the second logic channel due to the fact that the UE sends the preamble through the primary first resource, the preamble may be sent through the at least one first resource not overlapping the at least one second resource, and the first SR may be sent through the at least one second resource not overlapping the at least one first resource, thereby ensuring that both the preamble corresponding to the first logic channel and the second SR corresponding to the second logic channel may be sent successfully.

The priority of the first logic channel and the priority of the second logic channel may be preset, such as at the UE. Or they may be preset at a base station and sent to the UE through configuration information sent by the base station.

Figure 4:
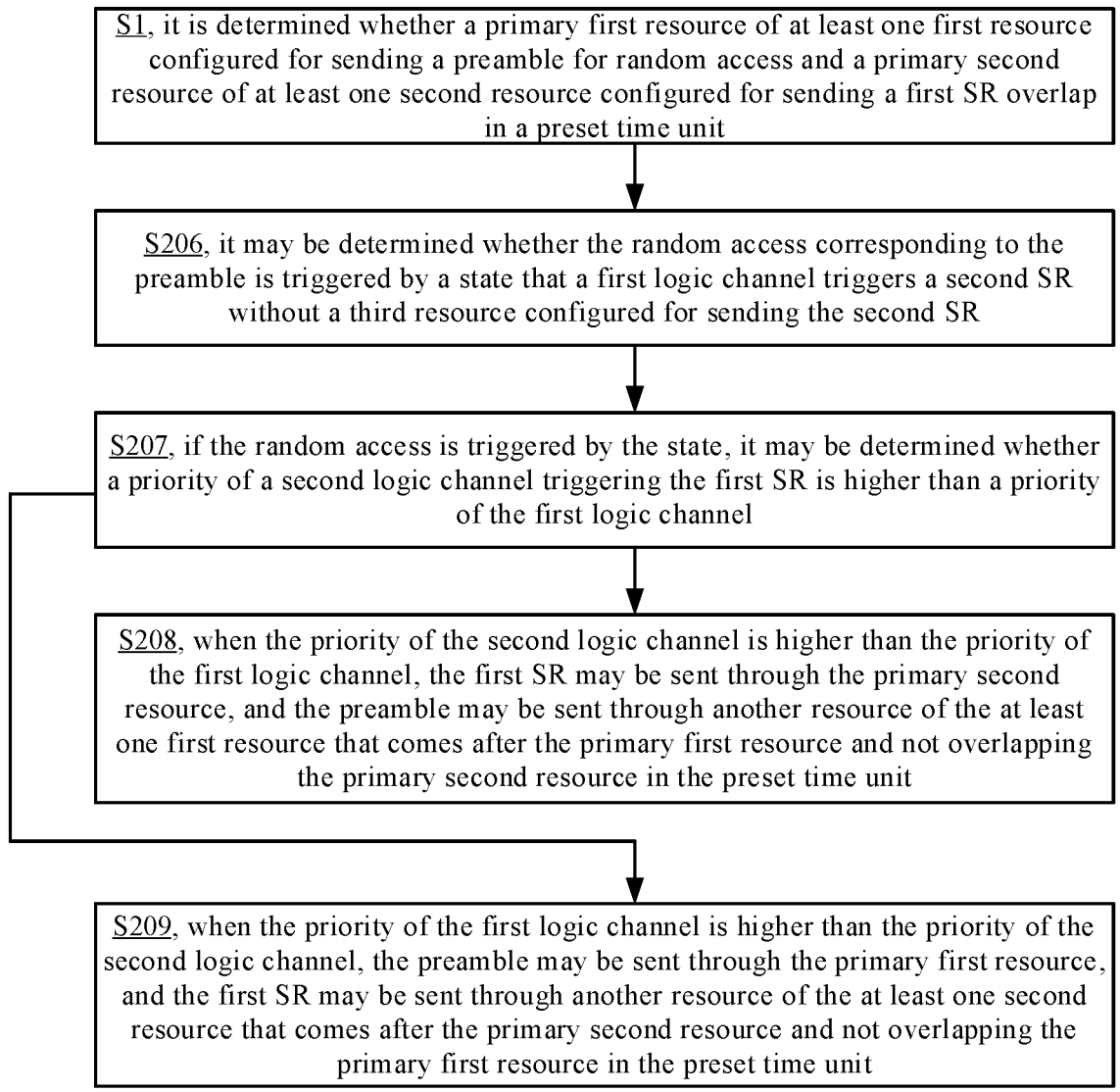
FIG. 4 is a flowchart of a method for sending a preamble and a SR according to an embodiment herein.

FIG. 4 is a flowchart of a method for sending a preamble and a SR according to an embodiment herein. As shown in FIG. 4, based on the embodiment shown in FIG. 1, the preamble may be sent through the at least one first resource not overlapping the at least one second resource, and the first SR may be sent through the at least one second resource not overlapping the at least one first resource, as follows.

In S206, it may be determined whether the random access corresponding to the preamble is triggered by a state that a first logic channel triggers a second SR without a third resource configured for sending the second SR.

In S207, if the random access is triggered by the state, it may be determined whether a priority of a second logic channel triggering the first SR is higher than a priority of the first logic channel.

In S208, when the priority of the second logic channel is higher than the priority of the first logic channel, the first SR may be sent through the primary second resource, and the preamble may be sent through another resource of the at least one first resource that comes after the primary first resource. The another resource of the at least one first resource does not overlap the primary second resource in the preset time unit.

In S209, when the priority of the first logic channel is higher than the priority of the second logic channel, the preamble may be sent through the primary first resource, and the first SR may be sent through another resource of the at least one second resource that comes after the primary second resource. The another resource of the at least one second resource does not overlap the primary first resource in the preset time unit.

In an embodiment, when the primary first resource and the primary second resource overlap in the preset time unit, it may be determined whether the random access corresponding to the preamble is triggered by a state that a first logic channel triggers a second SR without a third resource configured for sending the second SR. If so, it may mean that services corresponding respectively to the first logic channel and the second logic channel trigger SRs respectively. Thus, the two logic channels may be compared. Accordingly, priorities of the first logic channel and the second logic channel may be compared.

When the priority of the second logic channel is higher than the priority of the first logic channel, it may mean that data of the service corresponding to the second logic channel may have to be sent earlier than data of the service corresponding to the first logic channel are. Therefore, the first SR may be sent through the primary second resource, and the preamble may be sent through another resource of the at least one first resource that comes after the primary first resource. The another resource of the at least one first resource does not overlap the primary second resource in the preset time unit. Accordingly, the first SR corresponding to the second logic channel may be sent first, thereby ensuring that data of the service corresponding to the second logic channel may be sent earlier than data of the service corresponding to the first logic channel are.

When the priority of the first logic channel is higher than the priority of the second logic channel, it may mean that data of the service corresponding to the first logic channel may have to be sent earlier than data of the service corresponding to the second logic channel are. Therefore, the preamble may be sent through the primary first resource, and the first SR may be sent through another resource of the at least one second resource that comes after the primary second resource. The another resource of the at least one second resource does not overlap the primary first resource in the preset time unit. Accordingly, the preamble corresponding to the first logic channel may be sent first, thereby ensuring that data of the service corresponding to the first logic channel may be sent earlier than data of the service corresponding to the second logic channel are.

When the priority of the first logic channel equals the priority of the second logic channel, the preamble and the first SR may be sent in a mode same as when the priority of the first logic channel is higher than the priority of the second logic channel or in a mode same as when the priority of the second logic channel is higher than the priority of the first logic channel, which may be configured as needed.

The priority of the first logic channel and the priority of the second logic channel may be preset, such as at the UE. Or they may be preset at a base station and sent to the UE through configuration information sent by the base station.

Optionally, the priority of the first logic channel may be negatively correlated to a delay required by a service corresponding to the first logic channel. The priority of the second logic channel may be negatively correlated to a delay required by a service corresponding to the second logic channel.

In an embodiment, a priority of a logic channel may be set according to a delay requirement of a service corresponding to the logic channel. The shorter a delay demanded by a service corresponding to a logic channel is, the higher a priority of the logic channel.

Accordingly, for example, when the priority of the second logic channel is higher than the priority of the first logic channel, the first SR may be sent through the primary second resource, and the preamble may be sent through another resource of the at least one first resource that comes after the primary first resource. The another resource of the at least one first resource does not overlap the primary second resource in the preset time unit. Accordingly, the first SR corresponding to the second logic channel may be sent first, thereby ensuring that data of the service corresponding to the second logic channel may be sent earlier than data of the service corresponding to the first logic channel are, guaranteeing a short delay as required by the service corresponding to the second logic channel.

Correspondingly, when the priority of the first logic channel is higher than the priority of the second logic channel, the preamble may be sent through the primary first resource, and the first SR may be sent through another resource of the at least one second resource that comes after the primary second resource. The another resource of the at least one second resource does not overlap the primary first resource in the preset time unit. Accordingly, the preamble corresponding to the first logic channel may be sent first, thereby ensuring that data of the service corresponding to the first logic channel may be sent earlier than data of the service corresponding to the second logic channel are, guaranteeing a short delay as required by the service corresponding to the first logic channel.

Figure 5:
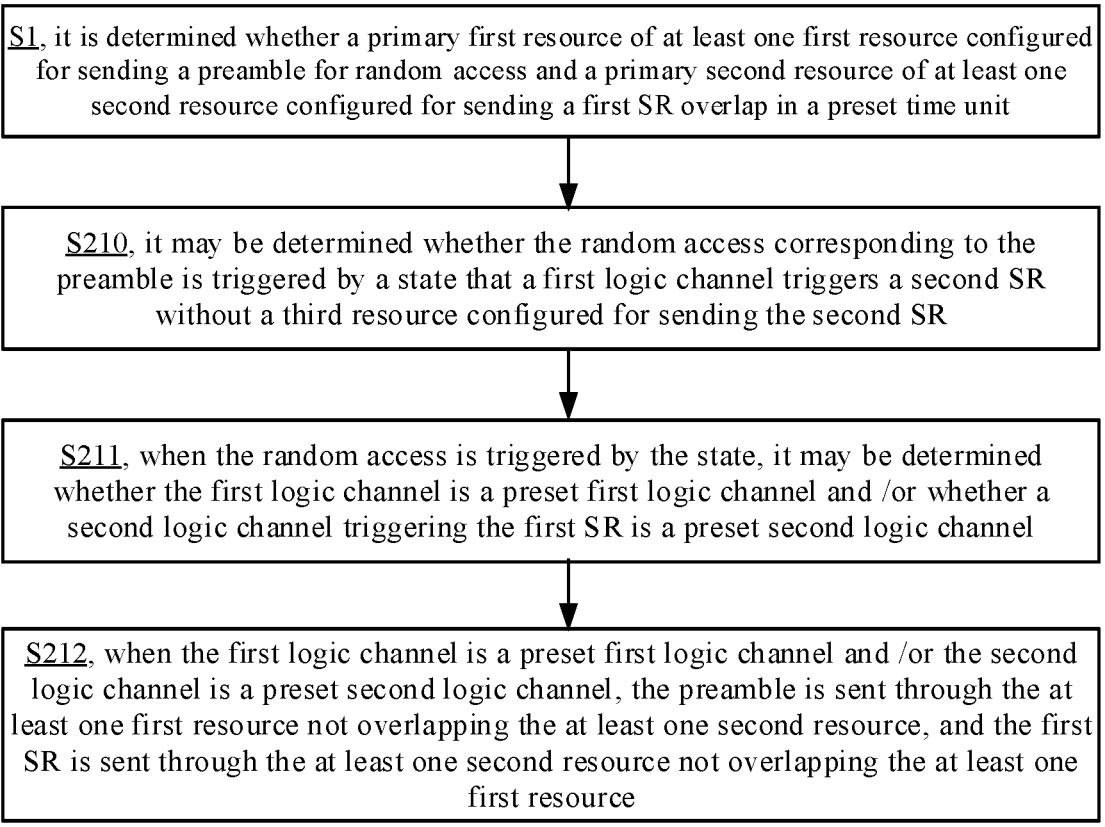
FIG. 5 is a flowchart of a method for sending a preamble and a SR according to an embodiment herein.

FIG. 5 is a flowchart of a method for sending a preamble and a SR according to an embodiment herein. As shown in FIG. 5, based on the embodiment shown in FIG. 1, the preamble may be sent through the at least one first resource not overlapping the at least one second resource, and the first SR may be sent through the at least one second resource not overlapping the at least one first resource, as follows.

In S210, it may be determined whether the random access corresponding to the preamble is triggered by a state that a first logic channel triggers a second SR without a third resource configured for sending the second SR.

In S211, when the random access is triggered by the state, it may be determined whether the first logic channel is a preset first logic channel and/or whether a second logic channel triggering the first SR is a preset second logic channel.

In S212, when the first logic channel is a preset first logic channel and/or the second logic channel is a preset second logic channel, the preamble is sent through the at least one first resource not overlapping the at least one second resource, and the first SR is sent through the at least one second resource not overlapping the at least one first resource.

In an embodiment, when the primary first resource and the primary second resource overlap in the preset time unit, it may be determined whether the random access corresponding to the preamble is triggered by a state that a first logic channel triggers a second SR without a third resource configured for sending the second SR. If so, it may mean that services corresponding respectively to the first logic channel and the second logic channel trigger SRs respectively. Thus, the two logic channels may be compared. Accordingly, a relation between the first logic channel and the second logic channel may be determined.

For example, it may be determined whether the first logic channel is a preset first logic channel and/or whether a second logic channel triggering the first SR is a preset second logic channel. The preset first logic channel and the preset second logic channel may be preset, such as at the UE. Or they may be preset at a base station and sent to the UE through configuration information sent by the base station.

When the first logic channel is a preset first logic channel, the preamble may be sent through the at least one first resource not overlapping the at least one second resource, and the first SR may be sent through the at least one second resource not overlapping the at least one first resource.

When the second logic channel triggering the first SR is a preset second logic channel, the preamble may be sent through the at least one first resource not overlapping the at least one second resource, and the first SR may be sent through the at least one second resource not overlapping the at least one first resource.

When the first logic channel is a preset first logic channel and the second logic channel triggering the first SR is a preset second logic channel, the preamble may be sent through the at least one first resource not overlapping the at least one second resource, and the first SR may be sent through the at least one second resource not overlapping the at least one first resource.

Accordingly, by presetting a preset logic channel, the operation that the preamble is sent through the at least one first resource not overlapping the at least one second resource, and that the first SR is sent through the at least one second resource not overlapping the at least one first resource, is made controllable.

Figure 6:
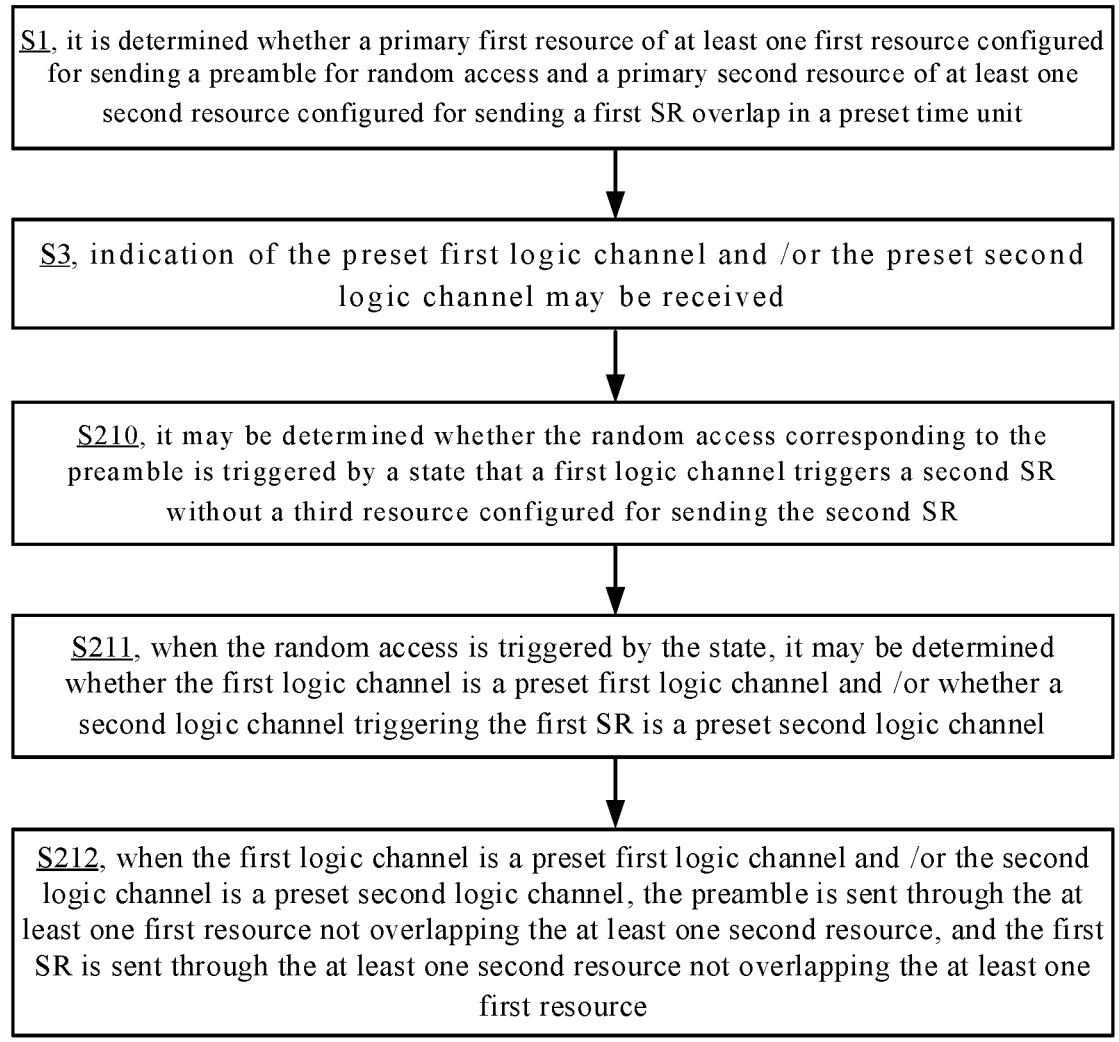
FIG. 6 is a flowchart of a method for sending a preamble and a SR according to an embodiment herein.

FIG. 6 is a flowchart of a method for sending a preamble and a SR according to an embodiment herein. As shown in FIG. 6, based on the embodiment shown in FIG. 5, the method may further include a step as follows.

In S3, before sending the preamble through the at least one first resource not overlapping the at least one second resource, and sending the first SR through the at least one second resource not overlapping the at least one first resource, indication of the preset first logic channel and/or the preset second logic channel may be received.

In an embodiment, the UE may determine the first logic channel and the second logic channel according to received indication. The UE may receive the indication from the base station, other UE, an operation input end of the UE per se (namely, the indication may be input by a user of the UE), etc.

Figure 7:
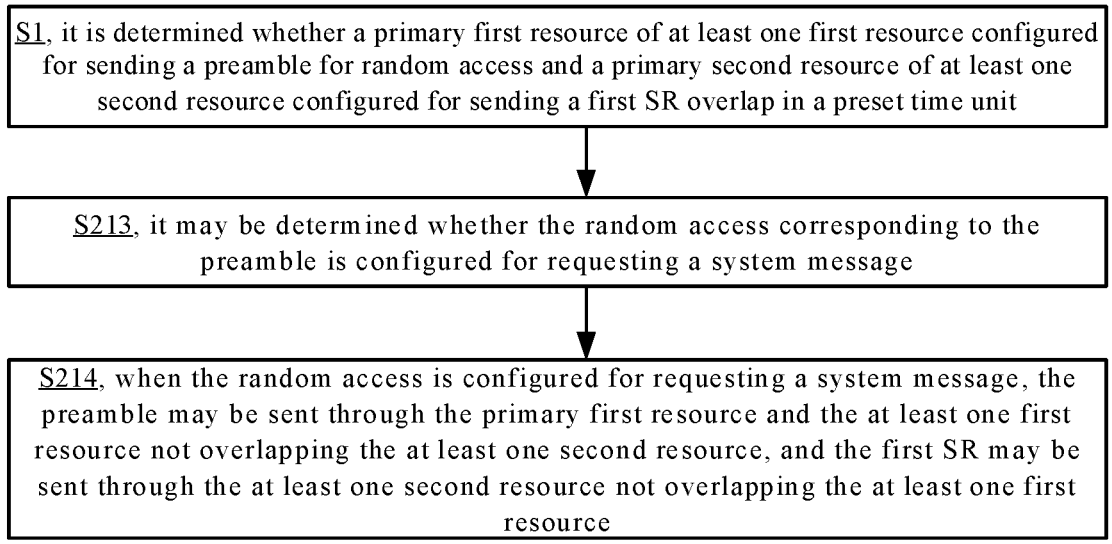
FIG. 7 is a flowchart of a method for sending a preamble and a SR according to an embodiment herein.

FIG. 7 is a flowchart of a method for sending a preamble and a SR according to an embodiment herein. As shown in FIG. 7, based on the embodiment shown in FIG. 1, the preamble may be sent through the at least one first resource not overlapping the at least one second resource, and the first SR may be sent through the at least one second resource not overlapping the at least one first resource, as follows.

In S213, it may be determined whether the random access corresponding to the preamble is configured for requesting a system message.

In S214, when the random access is configured for requesting a system message, the preamble may be sent through the primary first resource and the at least one first resource not overlapping the at least one second resource, and the first SR may be sent through the at least one second resource not overlapping the at least one first resource.

In related art, when the primary first resource and the primary second resource overlap in the preset time unit, the UE may select to send the preamble through the primary first resource, because by default the UE may prioritize preamble sending.

In an embodiment, when it is determined that the random access corresponding to the preamble is configured for requesting a system message, as requesting a system message is a UE-executed operation of a low priority, the preamble does not have to be sent first. Instead, the preamble may be sent through the at least one first resource not overlapping the at least one second resource, and the first SR may be sent through the at least one second resource not overlapping the at least one first resource, thereby ensuring that both the preamble corresponding to the first logic channel and the second SR corresponding to the second logic channel may be sent successfully.

Figure 8:
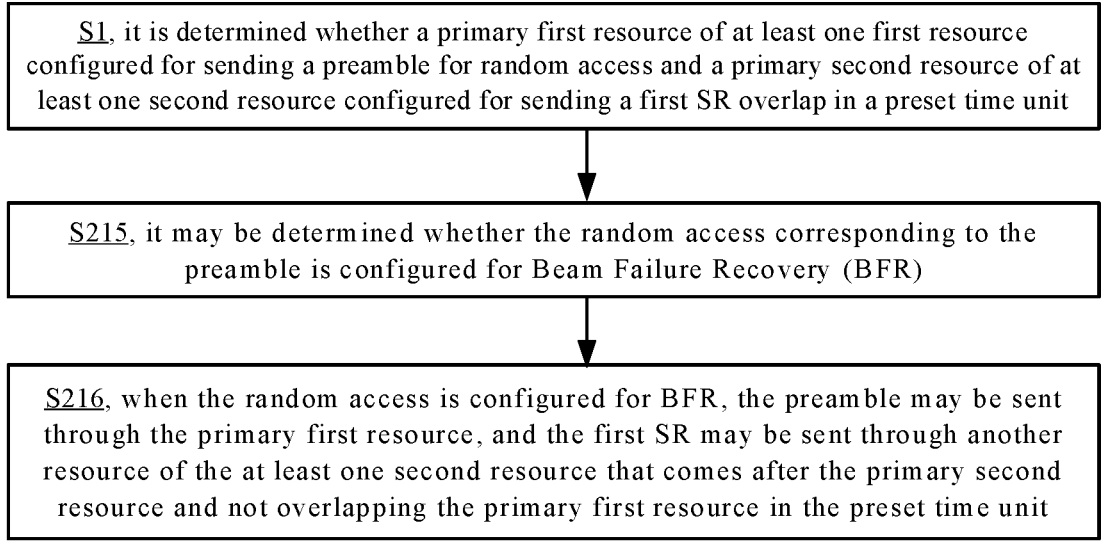
FIG. 8 is a flowchart of a method for sending a preamble and a SR according to an embodiment herein.

FIG. 8 is a flowchart of a method for sending a preamble and a SR according to an embodiment herein. As shown in FIG. 8, based on the embodiment shown in FIG. 1, the preamble may be sent through the at least one first resource not overlapping the at least one second resource, and the first SR may be sent through the at least one second resource not overlapping the at least one first resource, as follows.

In S215, it may be determined whether the random access corresponding to the preamble is configured for Beam Failure Recovery (BFR).

In S216, when the random access is configured for BFR, the preamble may be sent through the primary first resource, and the first SR may be sent through another resource of the at least one second resource that comes after the primary second resource and not overlapping the primary first resource in the preset time unit.

In an embodiment, in 5th-Generation (5G) communication, a base station may communicate with UE by beam scan. When access by a user fails for a beam, BFR may have to be performed, otherwise normal communication may fail. Therefore, BFR may be a UE-executed operation of a high priority. Therefore, when the random access corresponding to the preamble is configured for BFR, the preamble may be sent through the primary first resource, and then the first SR may be sent through another resource of the at least one second resource that comes after the primary second resource and not overlapping the primary first resource in the preset time unit. Accordingly, BFR is performed as soon as possible by first sending the preamble, thereby allowing UE to recover normal communication as soon as possible.

The subject disclosure further provides embodiments of a device for sending a preamble and a SR, corresponding to the embodiments of the method for sending a preamble and a SR.

Figure 9:
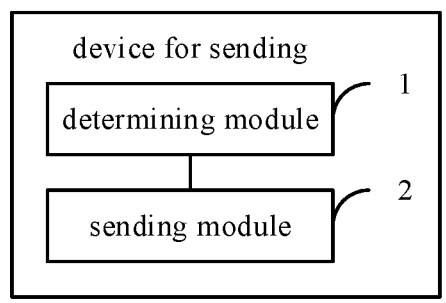
FIG. 9 is a block diagram of a device for sending a preamble and a SR according to an embodiment herein.

FIG. 9 is a block diagram of a device for sending a preamble and a SR according to an embodiment herein. The device herein may be applied to UE. The UE may be electronic equipment such as a mobile phone, a tablet computer, etc.

As shown in FIG. 9, the device for sending a preamble and a SR may include a determining module and a sending module.

The determining module 1 may be adapted to determining whether a primary first resource of at least one first resource configured for sending a preamble for random access and a primary second resource of at least one second resource configured for sending a first SR overlap in a preset time unit.

A sending module 2 may be adapted to, in response to determining that the primary first resource and the primary second resource overlap, sending the preamble through the at least one first resource not overlapping the at least one second resource, and sending the first SR through the at least one second resource not overlapping the at least one first resource.

Optionally, the preset time unit may be a slot, a mini-slot, or a sub-frame.

Figure 10:
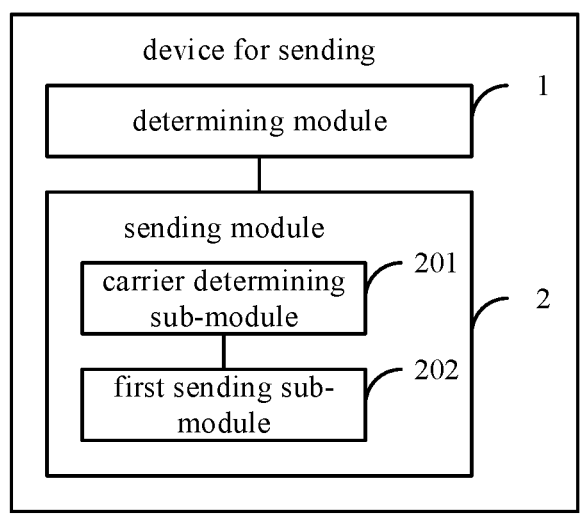
FIG. 10 is a block diagram of a device for sending a preamble and a SR according to an embodiment herein.

FIG. 10 is a block diagram of a device for sending a preamble and a SR according to an embodiment herein. As shown in FIG. 10, based on the embodiment shown in FIG. 9, the sending module 2 may include a carrier determining sub-module and a first sending sub-module.

The carrier determining sub-module 201 may be adapted to determining whether the primary first resource and the primary second resource are on a same carrier.

The first sending sub-module 202 may be adapted to, in response to determining that the primary first resource and the primary second resource are on a same carrier, sending the preamble through the at least one first resource not overlapping the at least one second resource, and sending the first SR through the at least one second resource not overlapping the at least one first resource.

Figure 11:
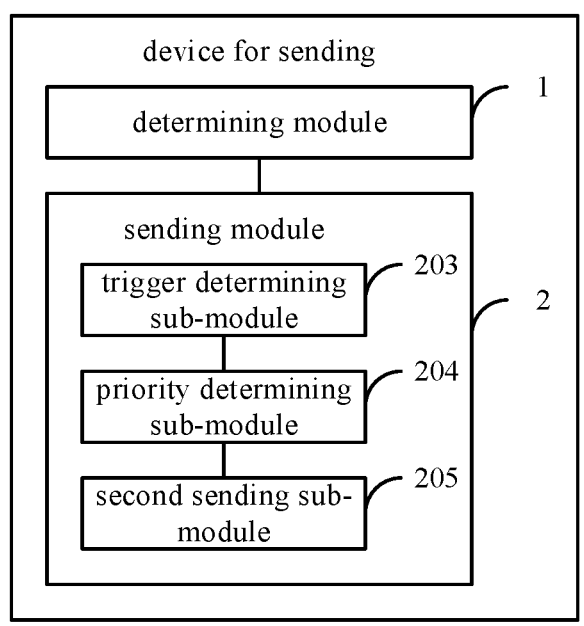
FIG. 11 is a block diagram of a device for sending a preamble and a SR according to an embodiment herein.

FIG. 11 is a block diagram of a device for sending a preamble and a SR according to an embodiment herein. As shown in FIG. 11, based on the embodiment shown in FIG. 9, the sending module 2 may include a trigger determining sub-module, a priority determining sub-module, and a second sending sub-module.

The trigger determining sub-module 203 may be adapted to determining whether the random access corresponding to the preamble is triggered by a state that a first logic channel triggers a second SR without a third resource configured for sending the second SR.

The priority determining sub-module 204 may be adapted to, in response to determining that the random access is triggered by the state, determining whether a priority of a second logic channel triggering the first SR is higher than a priority of the first logic channel.

The second sending sub-module 205 may be adapted to, in response to determining that the priority of the second logic channel is higher than the priority of the first logic channel, sending the preamble through the at least one first resource not overlapping the at least one second resource, and sending the first SR through the at least one second resource not overlapping the at least one first resource.

Figure 12:
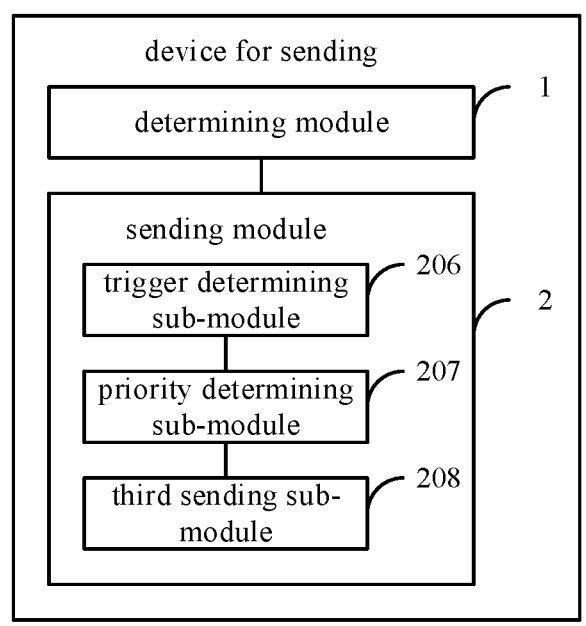
FIG. 12 is a block diagram of a device for sending a preamble and a SR according to an embodiment herein.

FIG. 12 is a block diagram of a device for sending a preamble and a SR according to an embodiment herein. As shown in FIG. 12, based on the embodiment shown in FIG. 9, the sending module 2 may include a trigger determining sub-module, a priority determining sub-module, and a third sending sub-module.

The trigger determining sub-module 206 may be adapted to determining whether the random access corresponding to the preamble is triggered by a state that a first logic channel triggers a second SR without a third resource configured for sending the second SR.

The priority determining sub-module 207 may be adapted to, in response to determining that the random access is triggered by the state, determining whether a priority of a second logic channel triggering the first SR is higher than a priority of the first logic channel.

The third sending sub-module 208 may be adapted to, in response to determining that the priority of the second logic channel is higher than the priority of the first logic channel, sending the first SR through the primary second resource, and sending the preamble through another resource of the at least one first resource that comes after the primary first resource, the another resource of the at least one first resource not overlapping the primary second resource in the preset time unit; and in response to determining that the priority of the first logic channel is higher than the priority of the second logic channel, sending the preamble through the primary first resource, and sending the first SR through another resource of the at least one second resource that comes after the primary second resource, the another resource of the at least one second resource not overlapping the primary first resource in the preset time unit.

Optionally, the priority of the first logic channel may be negatively correlated to a delay required by a service corresponding to the first logic channel. The priority of the second logic channel may be negatively correlated to a delay required by a service corresponding to the second logic channel.

Figure 13:
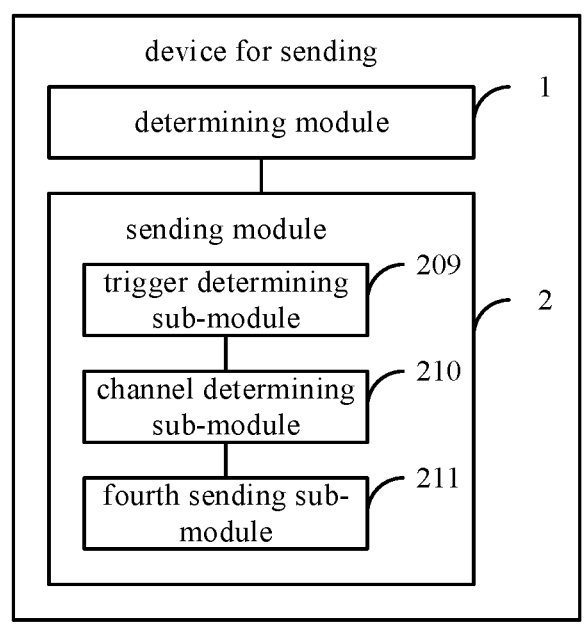
FIG. 13 is a block diagram of a device for sending a preamble and a SR according to an embodiment herein.

FIG. 13 is a block diagram of a device for sending a preamble and a SR according to an embodiment herein. As shown in FIG. 13, based on the embodiment shown in FIG. 9, the sending module 2 may include a trigger determining sub-module, a channel determining sub-module, and a fourth sending sub-module.

The trigger determining sub-module 209 may be adapted to determining whether the random access corresponding to the preamble is triggered by a state that a first logic channel triggers a second SR without a third resource configured for sending the second SR.

The channel determining sub-module 210 may be adapted to, in response to determining that the random access is triggered by the state, determining whether the first logic channel is a preset first logic channel and/or whether a second logic channel triggering the first SR is a preset second logic channel.

The fourth sending sub-module 211 may be adapted to, in response to determining that the first logic channel is a preset first logic channel and/or the second logic channel is a preset second logic channel, sending the preamble through the at least one first resource not overlapping the at least one second resource, and sending the first SR through the at least one second resource not overlapping the at least one first resource.

Figure 14:
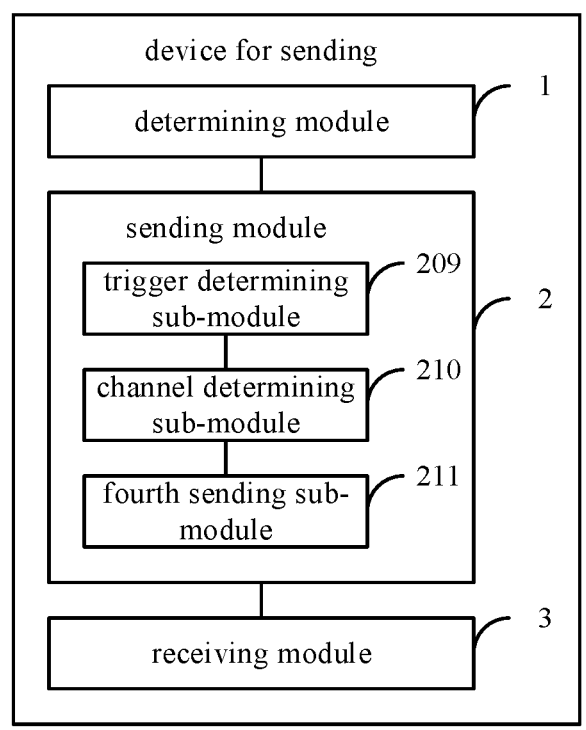
FIG. 14 is a block diagram of a device for sending a preamble and a SR according to an embodiment herein.

FIG. 14 is a block diagram of a device for sending a preamble and a SR according to an embodiment herein. As shown in FIG. 14, based on the embodiment shown in FIG. 13, the device may further include a receiving module.

The receiving module 3 may be adapted to receiving indication of the preset first logic channel and/or the preset second logic channel.

Figure 15:
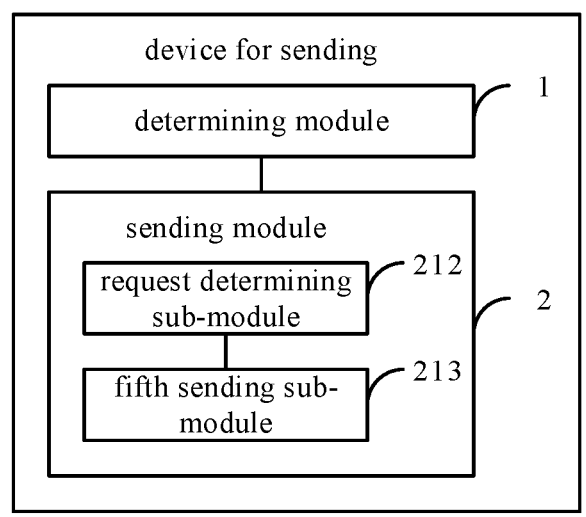
FIG. 15 is a block diagram of a device for sending a preamble and a SR according to an embodiment herein.

FIG. 15 is a block diagram of a device for sending a preamble and a SR according to an embodiment herein. As shown in FIG. 15, based on the embodiment shown in FIG. 9, the sending module 2 may include a request determining sub-module and a fifth sending sub-module.

The request determining sub-module 212 may be adapted to determining whether the random access corresponding to the preamble is configured for requesting a system message.

The fifth sending sub-module 213 may be adapted to, in response to determining that the random access is configured for requesting a system message, sending the preamble through the primary first resource, sending the preamble through the at least one first resource not overlapping the at least one second resource, and sending the first SR through the at least one second resource not overlapping the at least one first resource.

Figure 16:
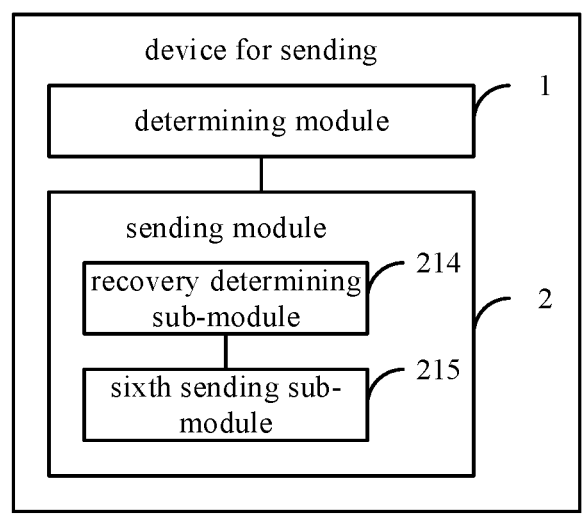
FIG. 16 is a block diagram of a device for sending a preamble and a SR according to an embodiment herein.

FIG. 16 is a block diagram of a device for sending a preamble and a SR according to an embodiment herein. As shown in FIG. 16, based on the embodiment shown in FIG. 9, the sending module 2 may include a recovery determining sub-module and a sixth sending sub-module.

The recovery determining sub-module 214 may be adapted to determining whether the random access corresponding to the preamble is configured for Beam Failure Recovery (BFR).

The sixth sending sub-module 215 may be adapted to, in response to determining that the random access is configured for BFR, sending the preamble through the primary first resource, and sending the first SR through another resource of the at least one second resource that comes after the primary second resource, the another resource of the at least one second resource not overlapping the primary first resource in the preset time unit.

A module of the device according to at least one embodiment herein may perform an operation in a mode elaborated in at least one embodiment of the method herein, which will not be repeated here.

An apparatus embodiment herein basically corresponds to a method embodiment herein, description of which may be referred to for a related part thereof. An apparatus embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand and implement the above without creative effort.

Embodiments herein further provide electronic equipment including a processor and memory.

The memory is adapted to storing an instruction executable by the processor.

The processor is adapted to implementing the method for sending a preamble and a SR according to any embodiment herein.

Embodiments herein further provide a computer-readable storage medium having stored thereon a computer program which, when executed by a processor, implements the method for sending a preamble and a SR according to any embodiment herein.

Figure 17:
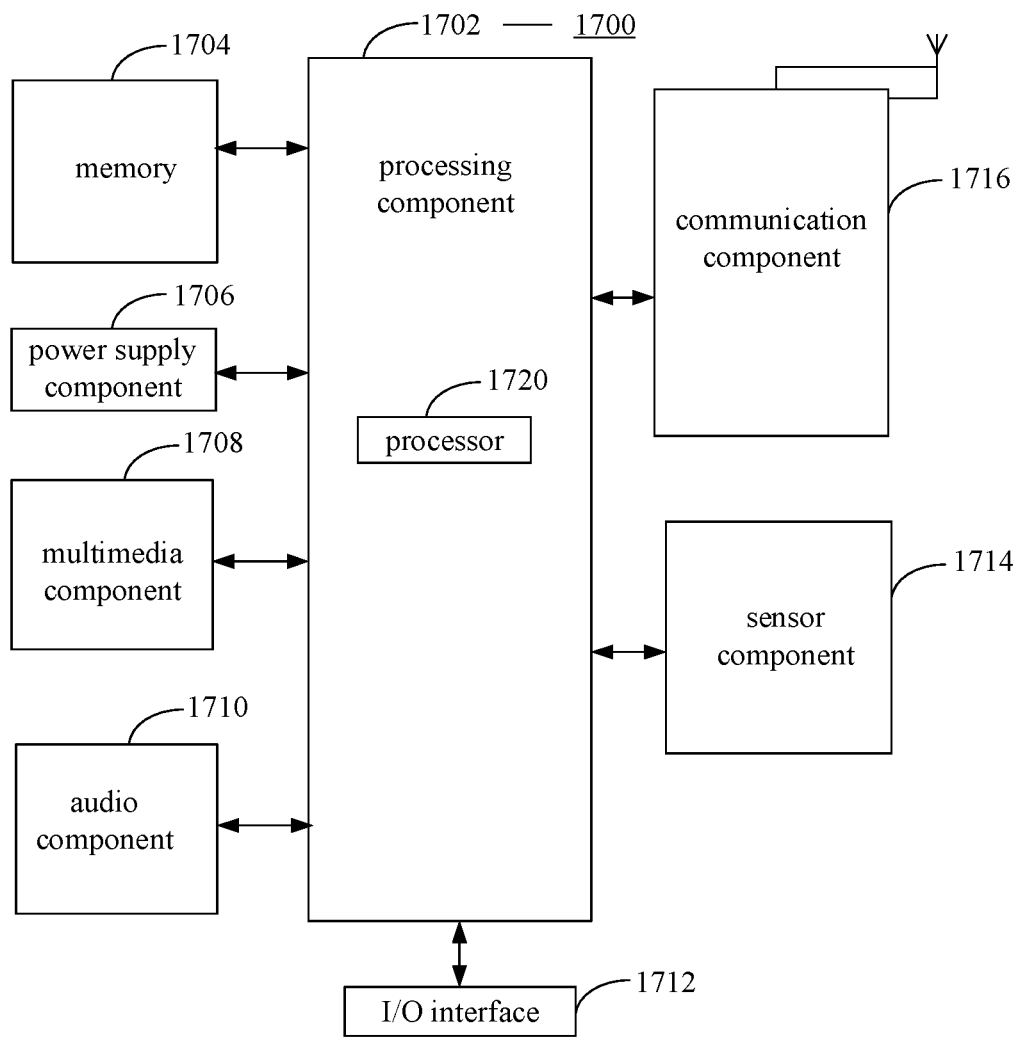
FIG. 17 is a block diagram of a device for sending a preamble and a SR according to an embodiment herein.

FIG. 17 is a block diagram of a device 1700 for sending a preamble and a SR, according to an embodiment herein. For example, the device 1700 may be UE such as a mobile phone, a computer, digital broadcast UE, messaging equipment, a gaming console, tablet equipment, medical equipment, fitness equipment, a personal digital assistant, etc.

Referring to FIG. 17, the device 1700 may include at least one of a processing component 1702, memory 1704, a power supply component 1706, a multimedia component 1708, an audio component 1710, an Input/Output (I/O) interface 1712, a sensor component 1714, a communication component 1716, etc.

The processing component 1702 may generally control an overall operation of the device 1700, such as operations associated with display, a telephone call, data communication, a camera operation, a recording operation, etc. The processing component 1702 may include one or more processors 1720 to execute instructions so as to complete all or a part of an aforementioned method. In addition, the processing component 1702 may include one or more modules to facilitate interaction between the processing component 1702 and other components. For example, the processing component 1702 may include a multimedia portion to facilitate interaction between the multimedia component 1708 and the processing component 1702.

The memory 1704 may be adapted to storing various types of data to support the operation at the device 1700. Examples of such data may include instructions of any APP or method adapted to operating on the device 1700, contact data, phonebook data, messages, pictures, videos, etc. The memory 1704 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1706 may supply electric power to various components of the device 1700. The power supply component 1706 may include a power management system, one or more power sources, and other components related to generating, managing, and distributing electricity for the device 1700.

The multimedia component 1708 may include a screen that provides an output interface between the device 1700 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1708 may include at least one of a front camera or a rear camera. When the device 1700 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1710 may be adapted to outputting and/or inputting an audio signal. For example, the audio component 1710 may include a microphone (MIC). When the device 1700 is in an operation mode such as a call mode, a recording mode, a voice recognition mode, etc., the MIC may be adapted to receiving an external audio signal. The received audio signal may be further stored in the memory 1704 or may be sent via the communication component 1716. The audio component 1710 may further include a loudspeaker adapted to outputting the audio signal.

The I/O interface 1712 may provide an interface between the processing component 1702 and a peripheral interface portion. Such a peripheral interface portion may be a keypad, a click wheel, a button, etc. Such a button may include but is not limited to at least one of a homepage button, a volume button, a start button, or a lock button.

The sensor component 1714 may include one or more sensors for assessing various states of the device 1700. For example, the sensor component 1714 may detect an on/off state of the device 1700 and relative positioning of components such as the display and the keypad of the device 1700. The sensor component 1714 may further detect a change in the location of the device 1700 or of a component of the device 1700, whether there is contact between the device 1700 and a user, the orientation or acceleration/deceleration of the device 1700, a change in the temperature of the device 1700, etc. The sensor component 1714 may include a proximity sensor adapted to detecting existence of a nearby object without physical contact. The sensor component 1714 may further include an optical sensor such as a Complementary Metal-Oxide-Semiconductor (CMOS) or a Charge-Coupled-Device (CCD) image sensor used in an imaging APP. The sensor component 1714 may further include an acceleration sensor, a gyroscope sensor, a magnetic sensor, a pressure sensor, a temperature sensor, etc.

The communication component 1716 may be adapted to facilitating wired or wireless communication between the device 1700 and other equipment. The device 1700 may access a wireless network based on a communication standard such as Wi-Fi, 2G, 3G . . . , or a combination thereof. The communication component 1716 may broadcast related information or receive a broadcast signal from an external broadcast management system via a broadcast channel. The communication component 1716 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the device 1700 may be realized by one or more electronic components such as an APP Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement a method herein.

In an exemplary embodiment, a non-transitory computer-readable storage medium including instructions, such as memory 1704 including instructions, may be provided. The instructions may be executed by the processor 1720 of the device 1700 to implement the method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

Note that herein, a relation term such as "first", "second", etc., is used merely to differentiate one entity or operation from another without necessarily requiring or implying existence of such an actual relation or order between such entities. A term such as "including/comprising", "containing", or any other variant thereof is intended to cover a non-exclusive inclusion, such that a process, method, article, or equipment including a series of elements not only includes the elements, but also includes other element(s) not explicitly listed, or element(s) inherent to such a process, method, article, or equipment. Given no more limitation, an element defined by a phrase "including a . . . " does not exclude existence of another identical element in a process, method, article, or device that includes the element.

Elaborated above are the method and device according to embodiments herein. The principle and the mode of implementation herein are illustrated with reference to specific examples. The embodiments are described merely to facilitate understanding of the method herein and the core concept thereof. A person having ordinary skill in the art may change a range or mode of the implementation according to the concept herein. Content herein shall not be taken as limiting the subject disclosure.

What is claimed is:

1. A method for sending a preamble and a Scheduling Request (SR), comprising:
   determining whether a primary first resource of at least one first resource configured for sending a preamble for random access and a primary second resource of at least one second resource configured for sending a first SR overlap in a preset time unit;
   in response to determining that the primary first resource and the primary second resource overlap, sending the preamble through the at least one first resource not overlapping the at least one second resource, and sending the first SR through the at least one second resource not overlapping the at least one first resource,
   wherein the method further comprises: sending both the first SR and the preamble to a base station respectively on the at least one first resource and the at least one second resource that do not overlap, thereby allowing both data corresponding to a logic channel corresponding to the first SR and data corresponding to a logic channel corresponding to the preamble to be sent to the base station in time,
   wherein the preset time unit is a slot, a mini-slot, or a sub-frame.

2. The method of claim 1, wherein the sending the preamble through the at least one first resource not overlapping the at least one second resource, and sending the first SR through the at least one second resource not overlapping the at least one first resource comprises:
   determining whether the primary first resource and the primary second resource are on a same carrier; and
   in response to determining that the primary first resource and the primary second resource are on a same carrier, sending the preamble through the at least one first resource not overlapping the at least one second resource, and sending the first SR through the at least one second resource not overlapping the at least one first resource.

3. The method of claim 1, wherein the sending the preamble through the at least one first resource not overlapping the at least one second resource, and sending the first SR through the at least one second resource not overlapping the at least one first resource comprises:
   determining whether the random access corresponding to the preamble is triggered by a state that a first logic channel triggers a second SR without a third resource configured for sending the second SR;
   in response to determining that the random access is triggered by the state, determining whether a priority of a second logic channel triggering the first SR is higher than a priority of the first logic channel;
   in response to determining that the priority of the second logic channel is higher than the priority of the first logic channel, sending the preamble through the at least one first resource not overlapping the at least one second resource, and sending the first SR through the at least one second resource not overlapping the at least one first resource.

4. The method of claim 1, wherein the sending the preamble through the at least one first resource not overlapping the at least one second resource, and sending the first SR through the at least one second resource not overlapping the at least one first resource comprises:
   determining whether the random access corresponding to the preamble is triggered by a state that a first logic channel triggers a second SR without a third resource configured for sending the second SR;
   in response to determining that the random access is triggered by the state, determining whether a priority of a second logic channel triggering the first SR is higher than a priority of the first logic channel;
   in response to determining that the priority of the second logic channel is higher than the priority of the first logic channel, sending the first SR through the primary second resource, and sending the preamble through another resource of the at least one first resource that comes after the primary first resource, the another resource of the at least one first resource not overlapping the primary second resource in the preset time unit; and
   in response to determining that the priority of the first logic channel is higher than the priority of the second logic channel, sending the preamble through the primary first resource, and sending the first SR through another resource of the at least one second resource that comes after the primary second resource, the another resource of the at least one second resource not overlapping the primary first resource in the preset time unit.

5. The method of claim 4, wherein the priority of the first logic channel is negatively correlated to a delay required by a service corresponding to the first logic channel, wherein the priority of the second logic channel is negatively correlated to a delay required by a service corresponding to the second logic channel.

6. The method of claim 1, wherein the sending the preamble through the at least one first resource not overlapping the at least one second resource, and sending the first SR through the at least one second resource not overlapping the at least one first resource comprises:

determining whether the random access corresponding to the preamble is triggered by a state that a first logic channel triggers a second SR without a third resource configured for sending the second SR;

in response to determining that the random access is triggered by the state, determining whether the first logic channel is a preset first logic channel and/or whether a second logic channel triggering the first SR is a preset second logic channel;

in response to determining that the first logic channel is a preset first logic channel and/or the second logic channel is a preset second logic channel, sending the preamble through the at least one first resource not overlapping the at least one second resource, and sending the first SR through the at least one second resource not overlapping the at least one first resource.

7. The method of claim 6, further comprising:

prior to the sending the preamble through the at least one first resource not overlapping the at least one second resource, and sending the first SR through the at least one second resource not overlapping the at least one first resource, receiving indication of the preset first logic channel and/or the preset second logic channel.

8. The method of claim 1, wherein the sending the preamble through the at least one first resource not overlapping the at least one second resource, and sending the first SR through the at least one second resource not overlapping the at least one first resource comprises:

determining whether the random access corresponding to the preamble is configured for requesting a system message;

in response to determining that the random access is configured for requesting a system message, sending the preamble through the primary first resource, sending the preamble through the at least one first resource not overlapping the at least one second resource, and sending the first SR through the at least one second resource not overlapping the at least one first resource.

9. The method of claim 1, wherein the sending the preamble through the at least one first resource not overlapping the at least one second resource, and sending the first SR through the at least one second resource not overlapping the at least one first resource comprises:

determining whether the random access corresponding to the preamble is configured for Beam Failure Recovery (BFR);

in response to determining that the random access is configured for BFR, sending the preamble through the primary first resource, and sending the first SR through another resource of the at least one second resource that comes after the primary second resource, the another resource of the at least one second resource not overlapping the primary first resource in the preset time unit.

10. Electronic equipment, comprising a processor and memory, wherein the memory is adapted to storing an instruction executable by the processor, wherein the processor is adapted to perform:

determining whether a primary first resource of at least one first resource configured for sending a preamble for random access and a primary second resource of at least one second resource configured for sending a first SR overlap in a preset time unit; and in response to the determining that the primary first resource and the primary second resource overlap, sending the preamble through the at least one first resource not overlapping the at least one second resource, and sending the first SR through the at least one second resource not overlapping the at least one first resource, wherein the processor is further adapted to perform:

sending both the first SR and the preamble to a base station respectively on the at least one first resource and the at least one second resource that do not overlap, thereby allowing both data corresponding to a logic channel corresponding to the first SR and data corresponding to a logic channel corresponding to the preamble to be sent to the base station in time, wherein the preset time unit is a slot, a mini-slot, or a sub-frame.

11. The electronic equipment of claim 10, wherein the processor is further adapted to perform sending the preamble through the at least one first resource not overlapping the at least one second resource, and sending the first SR through the at least one second resource not overlapping the at least one first resource by:

determining whether the primary first resource and the primary second resource are on a same carrier; and in response to determining that the primary first resource and the primary second resource are on a same carrier, sending the preamble through the at least one first resource not overlapping the at least one second resource, and sending the first SR through the at least one second resource not overlapping the at least one first resource.

12. The electronic equipment of claim 10, wherein the processor is further adapted to perform sending the preamble through the at least one first resource not overlapping the at least one second resource, and sending the first SR through the at least one second resource not overlapping the at least one first resource by:

determining whether the random access corresponding to the preamble is triggered by a state that a first logic channel triggers a second SR without a third resource configured for sending the second SR;

in response to determining that the random access is triggered by the state, determining whether a priority of a second logic channel triggering the first SR is higher than a priority of the first logic channel; and in response to determining that the priority of the second logic channel is higher than the priority of the first logic channel, sending the preamble through the at least one first resource not overlapping the at least one second resource, and sending the first SR through the at least one second resource not overlapping the at least one first resource.

13. The electronic equipment of claim 10, wherein the processor is adapted to sending the preamble through the at least one first resource not overlapping the at least one second resource, and sending the first SR through the at least one second resource not overlapping the at least one first resource by:

determining whether the random access corresponding to the preamble is triggered by a state that a first logic channel triggers a second SR without a third resource configured for sending the second SR;

in response to determining that the random access is triggered by the state, determining whether a priority of a second logic channel triggering the first SR is higher than a priority of the first logic channel;

in response to determining that the priority of the second logic channel is higher than the priority of the first logic channel, sending the first SR through the primary second resource, and sending the preamble through another resource of the at least one first resource that comes after the primary first resource, the another resource of the at least one first resource not overlapping the primary second resource in the preset time unit; and in response to determining that the priority of the first logic channel is higher than the priority of the second logic channel, sending the preamble through the primary first resource, and sending the first SR through another resource of the at least one second resource that comes after the primary second resource, the another resource of the at least one second resource not overlapping the primary first resource in the preset time unit.

14. The electronic equipment of claim 13, wherein the priority of the first logic channel is negatively correlated to a delay required by a service corresponding to the first logic channel, wherein the priority of the second logic channel is negatively correlated to a delay required by a service corresponding to the second logic channel.

15. The electronic equipment of claim 10, wherein the processor is further adapted to perform sending the preamble through the at least one first resource not overlapping the at least one second resource, and sending the first SR through the at least one second resource not overlapping the at least one first resource by:

determining whether the random access corresponding to the preamble is triggered by a state that a first logic channel triggers a second SR without a third resource configured for sending the second SR;

in response to determining that the random access is triggered by the state, determining whether the first logic channel is a preset first logic channel and/or whether a second logic channel triggering the first SR is a preset second logic channel; and in response to determining that the first logic channel is a preset first logic channel and/or the second logic channel is a preset second logic channel, sending the preamble through the at least one first resource not overlapping the at least one second resource, and sending the first SR through the at least one second resource not overlapping the at least one first resource.

16. The electronic equipment of claim 10, wherein the processor is adapted to perform sending the preamble through the at least one first resource not overlapping the at least one second resource, and sending the first SR through the at least one second resource not overlapping the at least one first resource by:

determining whether the random access corresponding to the preamble is configured for requesting a system message; and in response to determining that the random access is configured for requesting a system message, sending the preamble through the primary first resource, sending the preamble through the at least one first resource not overlapping the at least one second resource, and sending the first SR through the at least one second resource not overlapping the at least one first resource.

17. The electronic equipment of claim 10, wherein the processor is further adapted to perform sending the preamble through the at least one first resource not overlapping the at least one second resource, and sending the first SR through the at least one second resource not overlapping the at least one first resource by:

determining whether the random access corresponding to the preamble is configured for Beam Failure Recovery (BFR); and in response to determining that the random access is configured for BFR, sending the preamble through the primary first resource, and sending the first SR through another resource of the at least one second resource that comes after the primary second resource, the another resource of the at least one second resource not overlapping the primary first resource in the preset time unit.

18. A non-transitory computer-readable storage medium, having stored thereon a computer program which, when executed by a processor, implements:

determining whether a primary first resource of at least one first resource configured for sending a preamble for random access and a primary second resource of at least one second resource configured for sending a first SR overlap in a preset time unit;

in response to determining that the primary first resource and the primary second resource overlap, sending the preamble through the at least one first resource not overlapping the at least one second resource, and sending the first SR through the at least one second resource not overlapping the at least one first resource, wherein the computer program further implements: sending both the first SR and the preamble to a base station respectively on the at least one first resource and the at least one second resource that do not overlap, thereby allowing both data corresponding to a logic channel corresponding to the first SR and data corresponding to a logic channel corresponding to the preamble to be sent to the base station in time, wherein the preset time unit is a slot, a mini-slot, or a sub-frame.

* * * * *